United States Patent Office 3,618,393
Patented Nov. 9, 1971

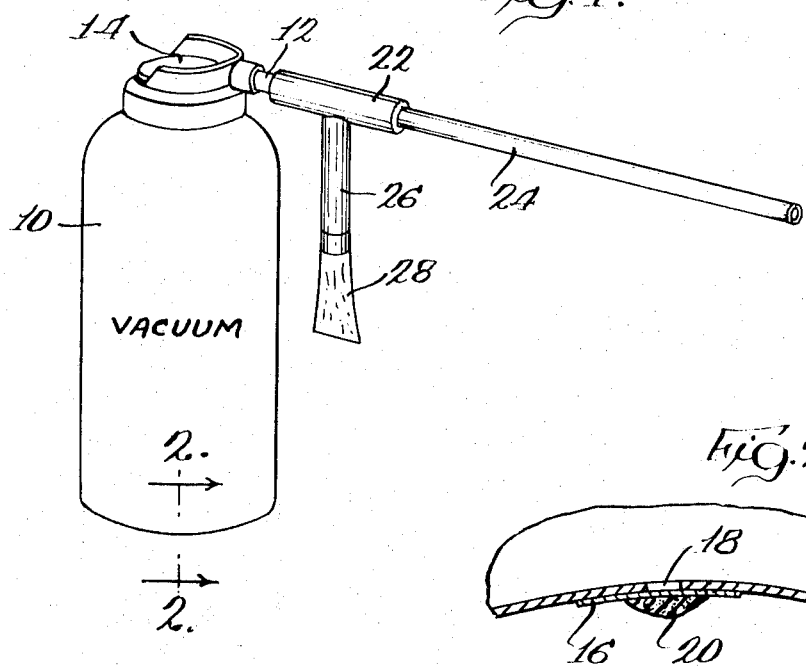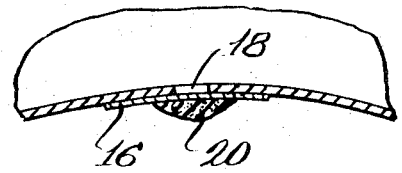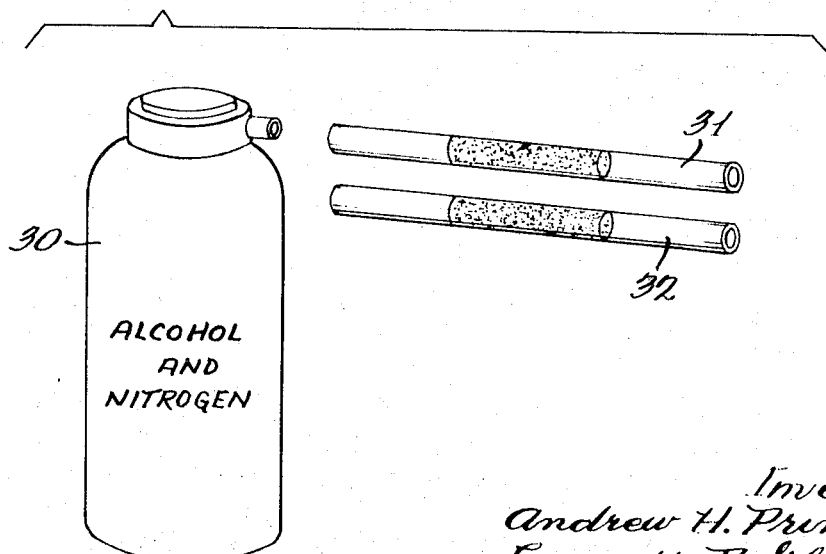

1

3,618,393
GAS SAMPLING APPARATUS AND METHOD
Andrew H. Principe, 5824 N. Newark, Chicago, Ill. 60631, and Emmett P. Glynn, Rte. 1, Lemont, Ill. 60439
Filed Feb. 27, 1969, Ser. No. 802,880
Int. Cl. G01n 1/24
U.S. Cl. 73—421.5 R                    8 Claims

ABSTRACT OF THE DISCLOSURE

Apparatus and method for taking samples of suspect gases, such as the breath of alveolar or deep lung air of drunk driving suspects and drugged race horses, gaseous products of combustion from suspected arsons and from explosions, air polluted by commercial exhausts, etc., and the facilitating scientific analysis thereof for example by gas chromatographic methods; characterized by a sample securing device comprising an evacuated canister having an inlet, a valve controlling said inlet and accommodating selective intake of gas into said canister, and a septum in said canister accommodating hypodermic extraction of gas from said canister.

BACKGROUND OF THE INVENTION

Many devices have heretofore been proposed for analysis of the breath, especially the deep lung or alveolar air, of persons suspected of drunk driving. Some of these devices have attained significant acceptance with the police and the courts, and are generally respected aids to traffic law enforcement.

However, the devices that have found acceptance are not portable and the police are required to take the suspect to a police station, laboratory or other similar facility to have the test made, and even then the test may be subject to legal criticism regarding reliability, the qualifications of the testing officer, the calibration of the machine, etc.; and there are no means available for reproducing the test as it applies to the particular suspect.

This invention proposes to secure a preservable sample of the suspect's breath or other suspect gas, which sample may be secured conveniently and expeditiously at the scene without bringing the suspect to a testing facility or taking complicated and sensitive testing apparatus to the scene. The sample may be taken or sent (even mailed) to a scientific laboratory staffed by qualified scientists where a portion of the sample can be tested on the most advanced and sensitive testing equipment available, such as a chromatograph which enjoys a respected reputation for scientific reliability. Thus, the disadvantages of the prior devices are largely if not entirely overcome.

Also, by taking a sample of greater volume than required for testing, part of the sample can be preserved for reproducing the test at a alter date should that prove necessary.

The sample is secured according to the invention in and by means of an evacuated can or canister which will positively and reliably suck in a predetermined volume of the alveolar air of the drunk driving suspect wherever he may be apprehended or found, for example, even injured at the scene of an accident. Also, our sample securing device now facilitates the securing of gas samples not previously obtainable by law enforcement and like agencies, such as the breath of racing horses and dogs suspected of improper medication, the gaseous products of combustion of a suspected arson, the gaseous products of an explosion, samples of air suspected to be polluted, etc., all of which may thereafter be reliably analyzed with due caution and without undue haste by fully qualified scientists using scientifically reliable methods.

Other features and advantages of the invention will become apparent from the drawings and the following description which are given for purposes of acquainting those skilled in the art with the best mode presently contemplated by us for carrying out our invention.

The drawings:

FIG. 1 is a perspective view of the sample securing device of the invention as equipped for sampling the breath of a human being;

FIG. 2 is a fragmentary cross-sectional view of the bottom wall of the sample receiving canister, the view being taken substantially on line 2—2 of FIG. 1; and FIG. 3 is a perspective view of complementary apparatus that may be used for several purposes, including a quick and economical, on-the-scene test for breath alcohol.

Description

Referring to FIGS. 1 and 2, the prime component of our apparatus is an evacuated canister 10 equipped with an inlet 12, a manually operated valve 14 for controlling said inlet to accommodate selective intake of gas into the canister, and a septum 16 in a wall of the canister accommodating hypodermic extraction of gas from the canister.

The canister may be any selected vessel or container conveniently and economically available, such as a glass, cardboard or metal container capable of being evacuated and of sufficient strength to withstand handling and shipment. For our purposes, we have found a conventional metal aerosol can to be highly practical and very economical.

Aerosol cans conventionally comprise a metal body equipped at the upper end thereof with a tube communicating with the interior of the can and a finger operated valve for controlling communication between the interior of the can and atmosphere through said tube. The lower wall of the can is usually concave, and therefore provides an ideal, sheltered or protected space within which the septum 16 of this invention may be provided. For the purpose, the bottom wall of the can is centrally perforated to provide an access hole 18, which is then covered by a septum wall 16 of vinyl or the like adapted to be pierced by a hypodermic needle. To insure automatic self-sealing of the septum following piercing by a needle, the wall 16 is preferably covered by a globule 20 of self-sealing material, such as RTV-Silicone Rubber.

Further in accord with the invention, the interior of the can comprises or is coated with an inert material to prevent any reaction with or contamination of the gas sample to be taken. Also, a filter for screening out particulate matter is preferably embodied in the inlet 12.

In evacuating the canister, we first evacuate the can, then bleed back nitrogen into the can to about atmospheric pressure, then re-evacuate and again bleed nitrogen back, and finally evacuate to the final desired level, whereby any molecular content remaining in the can is nitrogen which is inert to the gases to be sampled; thereby to assure accurate and reliable sample-taking and rentention.

The can preferably has a volume or capacity to receive a gas sample of about 125 cc., which is several times the amount of gas required for gas chromatographic analysis, whereby the can receives sufficient gas to permit several separate analyses; and particularly to permit initial analysis plus retention of sufficient gas to accommodate reproduction of the analysis at a later date. However, any size canister may be used as desired or required. To facilitate rapid taking of a sample, the can is preferably evacuated to about 25–26 inches of mercury, but again this is subject to variation as desired for particular circumstances.

Aerosol cans are thus readily adapted to the present invention, and due to their mass production are available at such low cost as to be disposable after a single use, thereby eliminating any problems of re-sterilization, mixing of samples, or the like. Also, being metal, these cans can be handled, carried about in police squad cars, shipped by mail, etc. without damage.

To afford particular facility for the taking of human breath samples in drunkenness cases, each canister intended for this use is accompanied by a kit comprised of a T tube 22 and a gas or breath tube 24, the T-tube including an exhaust leg or tube 26 having a very simple one-way valve 28 on its end. These components may be economically formed of plastic to be discarded after a single use and are packaged in a contaminant-protective bag that can be attached to or otherwise accompany the can. The officer taking the sample simply pushes one end of the tube 22 onto the inlet 12 of the can and pushes the breath tube 24 into the other end of the tube 22.

The officer then instructs the suspect to breathe into (i.e. exhale through) the free end of the tube 24. The mouth and lung surface air are blown through the tubes 24 and 26 by the suspect, the same exhausting through the valve 28, which may simply be a limp tube of plastic normally collapsed on itself but adapted to be blown open by pressure from the tube 26, but to close tight upon reversal of the pressure balance. The officer observes the suspect and as the suspect reaches the end of a complete exhalation, the officer depresses the pushbutton of valve 14 whereupon a sample of the suspect's alveolar or deep lung air is quickly sucked into the interior of the canister. A highly reliable sample is thereby secured because the suspect has no control over the sample; the sample being literally sucked out of his lungs without contamination or dilution.

The primary purpose of the sample is for laboratory analysis by qualified scientists using scientifically reliable apparatus to afford unequivocal legal proof, qualitatively and quantitatively, of the suspect's breath alcohol. To identify the sample, the exterior of the can is preferably coated or painted with ink receptive material and an imprint is made thereon providing space for the date, time and place of the sample taking, the name, address, age, sex, license number and signature of the suspect, the traffic violation(s) involved, data concerning any related accident, the name and badge number of the officer and/or any other information that may be desired by the agency or agencies concerned.

Should an instantaneous test be desired to determine the advisability of arrest, detention, suspension of driving privileges or the like, the officer may be provided with the apparatus of FIG. 3, namely an aerosol can 30 containing a standard breath alcohol sample and a pair of ampules 31 and 32 each containing a charge of chemicals that change color when exposed to or reacted with ethanol. These ampules may be used either (a) by having the suspect breathe into one and releasing a quantity of gas from the can 30 into the other and then comparing the colors of the ampules; or (b) by hypodermically withdrawing measured specimens from the sample can 10 and the standard can 30, injecting the measured specimens into the respective ampules and then comparing the colors of the two. For test (a) the can 30 would contain a pressurized charge of alcohol and nitrogen, and for test (b) the can 30 would be identical to can 10 and contain either a pressurized or non-pressurized charge of alcohol and nitrogen. Test (b) is regarded as more scientific and reliable.

A mixture of nitrogen and alcohol is used as the standard breath alcohol sample because the nitrogen will serve as an inert carrier for the alcohol and will maintain the stability of the alcohol.

In addition to the foregoing, the can 30 containing the standard breath alcohol medium may be used to test and calibrate simplified field versions of gas chromatographic apparatus and all spectrophotometric devices. In addition, cans 30 containing predetermined and variable quantities of alcohol can be used most advantageously to re-test the qualifications of personnel certified to conduct breath alcohol tests.

After the sample has been taken, and part thereof used for an instantaneous test as above described, the sample can 10 may be filed away awaiting the suspect's plea of not guilty on a drunk driving ticket, and then (or immediately) sent or delivered to a laboratory for analysis. Inasmuch as the can is sealed and its contents now at atmospheric pressure, no significant change will occur in the sample over a reasonable and sufficiently long period of time to accommodate disposition of the charge against the suspect. Also, the can may be mailed to and from laboratories from relatively remote and small police forces so that these forces are not required to buy expensive equipment or retain staff scientists, inasmuch as the testing can be done by a central laboratory serving many such law enforcement agencies. Thus, many economies are afforded, and even the small police force can avail itself of the most modern technologies in law enforcement.

For gas sampling other than the breath of human beings, the assembly 22, 24, 26 is not required and the sample may be taken directly through the inlet 12 of the can 10. However, an inlet extension like the tube 24 may prove advantageous in animal cases, and also where it is desired to secure a sample from a hole or crevice not easily reached by a human, or believed to be unsafe for close approach by a human. For example, using a suitably long tubular extension (in essence like the tube 24), the can may be used, especially in conjunction with an appropriately charged ampule like the ampules 31 and 32, to check for gas leaks and the like, especially explosive and/or poisonous gases.

In all such cases, a specimen may be hypodermically extracted from the can through the septum 16 for an on-the-spot check, and the remainder of the sample sent to a laboratory for detailed analysis of further hypodermically extracted specimens. In the laboratory analytical methods may be employed for unequivocal identification of the sample, both qualitatively and quantitatively, especially by gas-liquid chromatographic methods.

Having thus described what we contempltae to be the best mode of carrying out our invention, it is believed apparent that those skilled in the art may effect variations and rearrangements therein without departing from the scope of the invention, as defined by the appended claims.

We claim:
1. A gas sampler comprising an evacuated canister having an inlet, a valve controlling said inlet, a gas tube connected to said inlet, an exhaust tube connected to said gas tube, and a one-way valve on said exhaust tube accommodating discharge only of gas from said gas tube.

2. The sampler of claim 1 wherein the canister is evacuated to a vacuum pressure of about 25–26 inches of mercury.

3. The sampler of claim 1 wherein the canister has a gas sampling capacity of about 125 cc.

4. The sampler of claim 1 wherein the canister has a concave bottom wall and a septum is provided in said bottom wall for accommodating hypodermic extraction of gas from said canister.

5. The sampler of claim 4 wherein the septum comprises a septum member secured to the bottom wall of the canister and an overlying globule of self-sealing material.

6. A method of taking samples of human breath comprising the steps of causing a person to exhale through a gas tube, exhausting the exhaled breath from said tube, at substantially the end of the person's breath exhalation cycle discontinuing the exhausting of said tube and there-upon sucking a sample of breath from the person's mouth and lungs through said gas tube into an evacuated canister, and closing the canister to trap the sample therein.

7. The method of claim 6 wherein exhaled breath is exhausted from said tube via a one-way valve accommodating discharge only from said tube, and wherein the sucking of a sample into the canister and the closing of the canister to trap the sample therein is under the control of an inlet valve provided on said canister and connected to said gas tube.

8. The method of claim 6 wherein a specimen is extracted from the canister containing the sample of human breath and a like specimen is extracted from a canister containing a predetermined standard, and the two specimens are compared by respective chemically reactive visually observable tests.

References Cited

UNITED STATES PATENTS

| 2,374,227 | 4/1945 | Metcalf | 73—421.5 |
| 3,321,976 | 5/1967 | Jones | 73—421.5 |
| 3,490,288 | 1/1970 | Patnode | 73—421.5 |

OTHER REFERENCES

Nagle et al. Review of Scientific Instruments, vol. 139, No. 8; September 1968, p. 1388.

S. C. SWISHER, Primary Examiner

U.S. Cl. X.R.

73—425.6